United States Patent [19]

Winer

[11] 4,394,796
[45] Jul. 26, 1983

[54] VEGETATION STEM CUTTING APPARATUS

[76] Inventor: Brian A. Winer, P.O. Box 13 - Gallo Mannor, Johannesburg 2052, South Africa

[21] Appl. No.: 278,043

[22] Filed: Jun. 29, 1981

[51] Int. Cl.³ .............................................. A01G 3/00
[52] U.S. Cl. ........................................... 30/178; 47/6
[58] Field of Search ................. 30/191, 193, 186, 187, 30/188, 178, 229; 47/1, 6, 7, DIG. 2

[56] References Cited
U.S. PATENT DOCUMENTS
2,612,686 10/1952 Wagner ................................. 30/178

FOREIGN PATENT DOCUMENTS
347781 4/1937 Italy ....................................... 30/178

Primary Examiner—Jimmy C. Peters
Attorney, Agent, or Firm—William W. Haefliger

[57] ABSTRACT

Vegetation stem cutting apparatus comprises
(a) elongated tongs which are interconnected at a pivot,
(b) a table carried by one tong proximate the end thereof,
(c) and a knife carried by the other tong to close toward the table when the tongs are pivoted to cut the stem placed on the table,
(d) the knife extending at a substantial angle relative to a normal to the table when the knife edge is closed into proximity to the table.

8 Claims, 4 Drawing Figures

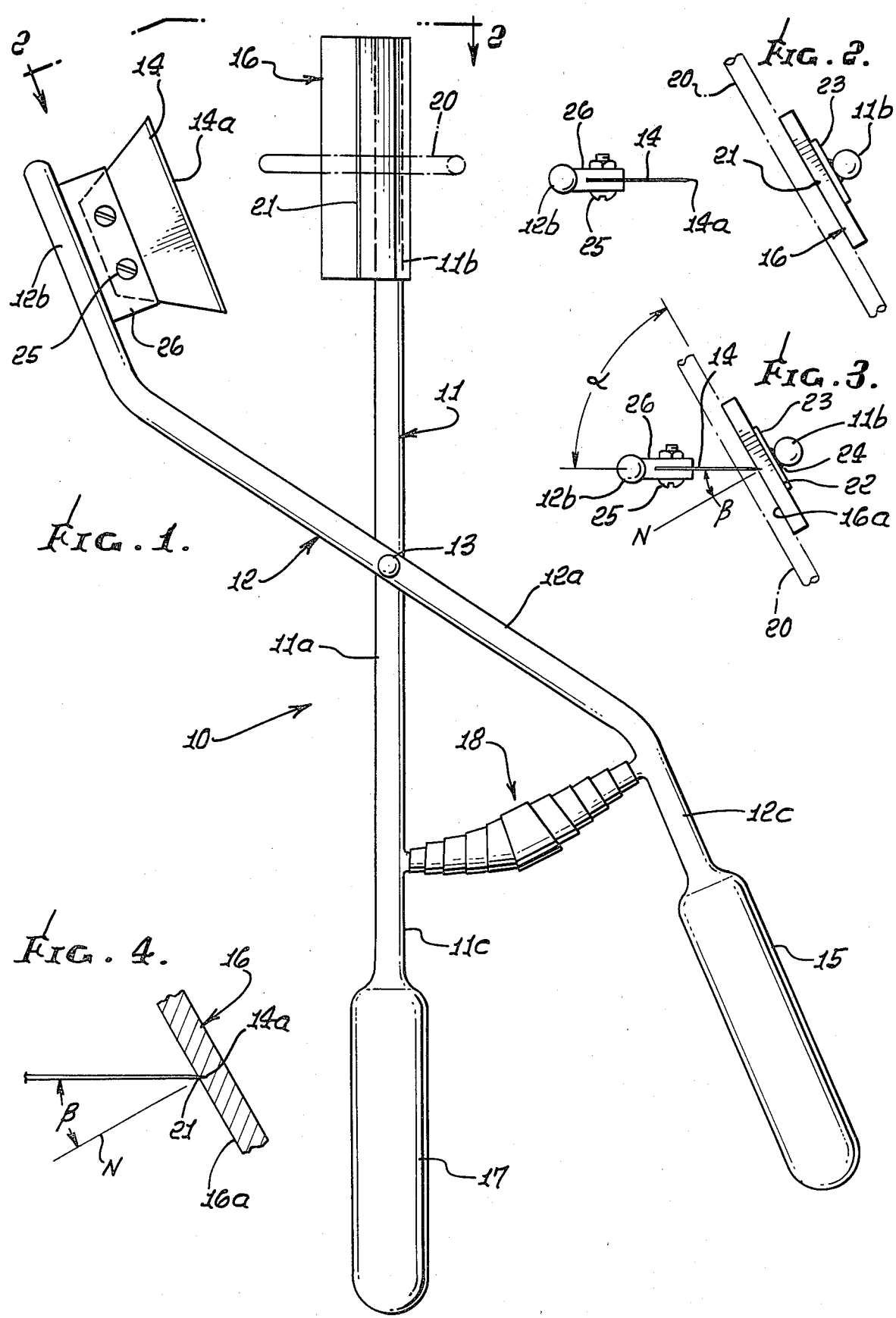

VEGETATION STEM CUTTING APPARATUS

BACKGROUND OF THE INVENTION

This invention relates generally to cutting of stems of plants such as flowers; and more particularly concerns apparatus usable to accurately and easily assure desired slanted cutting of such stems.

Fresh flowers deteriorate for several reasons. One important reason is the inability of the flower stems to absorb water, due to blockage. Blockage is in turn increased by stem cutting with scissors, the latter acting to squeeze shut the microscopic tubes through which solutions pass to reach the flowers and foliage. Further, the splitting of flower stalks opens a wide area inside the stem, damaging cells and allowing bacterial growth deep inside stems.

SUMMARY OF THE INVENTION

It is a major object of the invention to provide flower stem cutting apparatus operable to cut stems without crushing them, and with ease and simplicity. Basically, the apparatus comprises:

(a) elongated tongs which are interconnected at a pivot, (b) a table carried by one tong proximate the end thereof, (c) and a knife carried by the other tong to close toward the table when the tongs are pivoted to cut the stem placed on the table, (d) the knife extending at a substantial angle relative to a normal to the table when the knife edge is closed into proximity to the table.

Further, and as will appear, the knife defines a first plane and the table surface engaged by the knife edge defines a second plane, those planes intersecting non-perpendicularly when the knife edge is closed toward and into a groove in the table, to cut a stem or stems placed adjacent the table to extend generally perpendicular to the groove. The latter therefore also acts as an indicia for stem placement, and as a result, the stems are sliced at slant angles, and without crushing, for stem and flower preservation. The groove and table typically extend in the direction of the tong carrying the table.

Also, the table preferably consists of a material less hard than the knife material, and typically of wood or plastic; a spring is employed to urge the tongs toward a spread apart condition; and the knife or blade is attached to its tong as by a fastener or fasteners permitting replacement.

These and other objects and advantages of the invention as well as the details of an illustrative embodiment, will be more fully understood from the following specification and drawings, in which:

DRAWING DESCRIPTION

FIG. 1 is a side elevation showing vegetation stem cutting apparatus embodying the invention;

FIG. 2 is a fragmentary view taken on lines 2—2 of FIG. 1, showing the relationship of a knife and cutting table associated with the FIG. 1 apparatus;

FIG. 3 is an endwise view showing cutting of a stem being cut; and

FIG. 4 is an enlarged fragmentary view showing the knife edge in a groove in the table.

DETAILED DESCRIPTION

In FIG. 1, the vegetation stem cutting apparatus 10 is shown to comprise elongated tongs 11 and 12 which are interconnected by a pivot pin 13. Tong 11 is preferably straight throughout its length, whereas tong 12 includes an elongated mid-portion 12a, a first end portion 12b carrying a knife 14, and a second end portion 12c carrying a handle 15. End portions 12b and 12c are angled relative to mid-portion 12a, so that tong 12 has a shallow Z configuration.

Tong 11 has a mid-portion 11a connected to mid-portion 12a by pin 13; first end portion 11b carrying a platform or table 16; and second end portion 11c carrying a handle 17. A spring 18 is connected to tongs 11 and 12 as shown to urge them toward spread-apart condition, i.e. in directions tending to separate the knife and table.

More specifically, the knife 14 is carried by its tong 12 to close toward the table when the apparatus is operated (handles 15 and 17 urged manually toward one another) to cut a stem (for example of a flower) placed on or adjacent the table, as seen in FIGS. 2-4. Those views also show that the knife extends at a substantial angle $\beta$ relative to a normal N to the table, when the knife edge 14a is closed into proximity to the table. As a result, a plant or flower stem 20 placed against the table as shown, i.e. generally perpendicular to groove 21 on the table, is cut or sliced, without crushing, and at an angle $\alpha$ relative to the stem axis, $\alpha$ being substantially less than 90°.

It will be noted that the thin knife defines a first plane, and the table surface 16a defines a second plane, those two planes intersecting non-perpendicularly at groove 21 when the knife edge is closed into proximity to the table. Groove 21 extends lengthwise of the table, in the general direction of the tong 11. Also it extends slightly into the table for full reception of the knife edge, assuring that the edge passes through the stem. The table is less hard than the knife material, and is typically non-metallic, consisting of wood or plastic for example. It is supported as by bonding at 22 to a metal strip 23 attached at 24 to the tong portion 11b. The knife or blade 14 is removably attached as by fasteners 25 to a bifurcated holder 26 integral with tong portion 12b. Thus, the blade may be easily replaced when desired.

Typically, the knife or blade thickness is less than 0.01 inch, to assure clean slicing of the stem, without crushing. Groove 21 extends into the table at an angle $\beta$ relative to normal N. $\beta$ is preferably between 20° and 40°. The sum of $\alpha$ and $\beta$ is 90°.

I claim:

1. Vegetation stem cutting apparatus comprising
   (a) elongated tongs which are interconnected at a pivot,
   (b) a table carried by one tong proximate the end thereof,
   (c) and a thin knife carried by the other tong to close toward the table when the tongs are pivoted to cut the stem placed on the table,
   (d) the knife extending at a substantial angle relative to a normal to the table when the knife edge is closed into proximity to the table,
   (e) the thin knife defining a first plane, and the table surface defines a second plane, said planes intersecting non-perpendicularly when the knife edge is closed into proximity to the table, the direction of relative closing of the thin knife toward the table surface being angularity offset at an angle $\beta$ from a perpendicular to said surface, (f) and a shallow groove in said surface to receive only an edge portion defined by the blade.

2. The apparatus of claim 1 wherein the knife defines a first plane, and the table surface defines a second plane, said planes intersecting non-perpendicularly when the knife edge is closed into proximity to the table.

3. The apparatus of claim 1 wherein the table has a non-metallic surface facing the knife, to be engaged by the knife.

4. The apparatus of claim 3 wherein said surface consists of wood.

5. The apparatus of claim 1 wherein said table has a surface facing the knife, the material of said surface being softer than the material of the knife.

6. The apparatus of claim 2 wherein said second plane extends in the general direction of said one tong.

7. The apparatus of claim 6 wherein said table has a linear locus of engagement by the knife edge, said locus extending in the general direction of said one tong, that locus also acting as an indicia for flower placement adjacent the table, said locus defined by said shallow groove which extends into the table at said angle $\beta$ which is between 20° and 40°.

8. The apparatus of claim 1 including a spring connected to the tongs to urge them in directions tending to separate the knife and table.

* * * * *